United States Patent [19]
Tomioka et al.

[11] Patent Number: 5,522,417
[45] Date of Patent: Jun. 4, 1996

[54] ANTI-SPILLING VALVE FOR VEHICLE FUEL TANK

[75] Inventors: Kazuyuki Tomioka, Kanagawa-ken; Atsushi Takahashi, Fujisawa, both of Japan

[73] Assignee: Nifco Inc., Yokohama, Japan

[21] Appl. No.: 230,841

[22] Filed: Apr. 21, 1994

[51] Int. Cl.⁶ .................................... F16K 17/36
[52] U.S. Cl. .................................... 137/43; 137/202
[58] Field of Search ........................ 137/43, 202

[56] References Cited

U.S. PATENT DOCUMENTS

| | | | |
|---|---|---|---|
| 4,779,637 | 10/1988 | Ubaldi | 137/43 |
| 5,139,043 | 8/1992 | Hyde | 137/43 |

FOREIGN PATENT DOCUMENTS

| | | | |
|---|---|---|---|
| 616602 | 3/1961 | Canada | 137/43 |
| 63-50525 | 12/1988 | Japan | |

*Primary Examiner*—Robert G. Nilson
*Attorney, Agent, or Firm*—Oblon, Spivak, McClelland, Maier & Neustadt

[57] ABSTRACT

An anti-spilling valve for a vehicle fuel tank includes a cylindrical valve chamber having an upper wall at its upper end and closed at its lower end by a filter, an upwardly directed exhaust passage for fuel vapor formed at the center of the upper wall of the cylindrical valve chamber, a connecting pipe provided on the upper wall of the cylindrical valve chamber to extend radially outward and to have its inner end communicate with the upper end of the exhaust passage at a right angle, the inside diameters of the exhaust passage and the connecting pipe being equal, a float housed in the cylindrical valve chamber to be vertically movable and having on its upper surface a valve head adapted for closing the lower end of the exhaust passage, and a valve seat ring attached to the lower end of the exhaust passage closed by the valve head of the float, the valve seat ring having a smaller inside diameter than the exhaust passage.

6 Claims, 3 Drawing Sheets

ANTI-SPILLING VALVE FOR VEHICLE FUEL TANK

BACKGROUND OF THE INVENTION

1. Field of the Invention

This invention relates to an anti-spilling valve for a vehicle fuel tank, more particularly to an anti-spilling valve for installation in the top of the fuel tank of a vehicle, particularly an automobile, for preventing pressure buildup in the tank during normal operation by allowing internal tank pressure to escape to the exterior and for preventing spillage of gasoline to the exterior and reducing the danger of fire when the vehicle overturns or turns sharply.

2. Description of the Prior Art

Japanese Utility Model Public Disclosure Sho 63(1988)-50525 discloses an anti-spilling valve for a vehicle fuel tank comprising a cylindrical valve chamber having an upper cover, closed at the bottom and formed at the center of the upper cover with an upwardly directed exhaust passage for fuel vapor, a connecting pipe formed integrally with the top of the upper cover of the cylindrical valve chamber to extend radially outward and having the upper end of the exhaust passage communicating with its inner end at a right angle, and a float housed in the cylindrical valve chamber to be vertically movable and having on its upper surface a valve head adapted for closing the lower end of the exhaust passage.

The inside diameter of the upwardly directed exhaust passage formed in the upper cover of the cylindrical valve chamber is normally 2 mm and the inside diameter of the connecting pipe whose inner end communicates with the upper end of the exhaust passage at a right angle is normally 4 mm. For integrally forming the upper cover of the cylindrical valve chamber and the connecting pipe integrally of plastic, molten resin is injected into a die provided with a 2-mm vertical core pin for forming the exhaust passage and with a 4-mm lateral core pin for forming the bore of the connecting pipe, the upper end of the vertical core pin and the tip of the lateral core pin contacting each other at a right angle. The injection pressure is set high because low injection pressure may cause short molding. Since the two core pins merely meet each other at a right angle, however, use of a high injection pressure causes resin to pass in between their contacting portions. When this happens, a resin film is formed between the upper end of the exhaust passage and the interior of the end portion of the connecting pipe, resulting in a defective product in which the exhaust passage and the connecting pipe do not communicate. This makes it necessary to press the vertical and lateral core pins onto each other strongly so as to prevent the high-pressure resin from entering between them. When this is done, however, the thin (2 mm) vertical pin is apt to bend, making it impossible to form the exhaust passage.

This invention was accomplished in response to the foregoing circumstances and has as one of its objects to provide an anti-spilling valve for a vehicle fuel tank which enables the exhaust passage to be formed with high reliability and further enables reliable control of the fuel vapor pressure in the fuel tank.

Another object of the invention is to provide an anti-spilling valve for a vehicle fuel tank whose superior sealing property makes it readily installable in a plastic fuel tank.

SUMMARY OF THE INVENTION

For achieving the aforesaid objects, one aspect of the invention provides an anti-spilling valve for a vehicle fuel tank comprising a cylindrical valve chamber which has an upper wall, is closed at the bottom by a filter and is formed at the center of the upper wall with an upwardly directed exhaust passage, a connecting pipe provided on the upper wall of the cylindrical valve chamber to extend radially outward and to have its inner end communicate with the upper end of the exhaust passage at a right angle, and a float housed in the cylindrical valve chamber to be vertically movable and having on its upper surface a valve head adapted for closing the lower end of the exhaust passage, the anti-spilling valve being characterized in that the inside diameters of the exhaust passage and the connecting pipe are equal and that a valve seat ring having a smaller inside diameter than the exhaust passage is attached to the lower end of the exhaust passage closed by the valve head of the float.

In another aspect of the invention, a mounting member for mounting the cylindrical valve chamber in an opening of a fuel tank is provided on the upper wall, the exhaust passage is constituted by a cylindrical piece formed separately of the cylindrical valve chamber and the connecting pipe, and the cylindrical piece is imbedded in the upper wall of the cylindrical valve chamber and the mounting member.

In another aspect of the invention, the mounting member is formed of a resin exhibiting approximately the same coefficient of thermal expansion as the resin of which the fuel tank is formed.

By giving the connecting pipe and the exhaust passage the same diameter, it becomes possible to form the pipe and the passage using core pins of the same diameter. Because of this, the vertical pin is not susceptible to bending even when the lateral pin is pressed onto it with a strong force. The exhaust passage can therefore be formed with high reliability.

Further, when the cylindrical piece defining the exhaust passage is formed of rigid plastic beforehand, it can be positioned in the die cavity to enable the cylindrical valve chamber and the connecting pipe to be formed integrally. This enables the exhaust passage to be reliably formed without using a thin core pin.

In addition, by forming the mounting member for attaching the cylindrical valve chamber to the fuel tank of a resin exhibiting approximately the same coefficient of thermal expansion as the resin of which the fuel tank is formed, it becomes possible to ensure an excellent seal between the mounting member and the fuel tank irrespective of temperature change.

The above and other features of the present invention will become apparent from the following description made with reference to the drawings.

DESCRIPTION OF THE PREFERRED EMBODIMENTS

Figure 1:
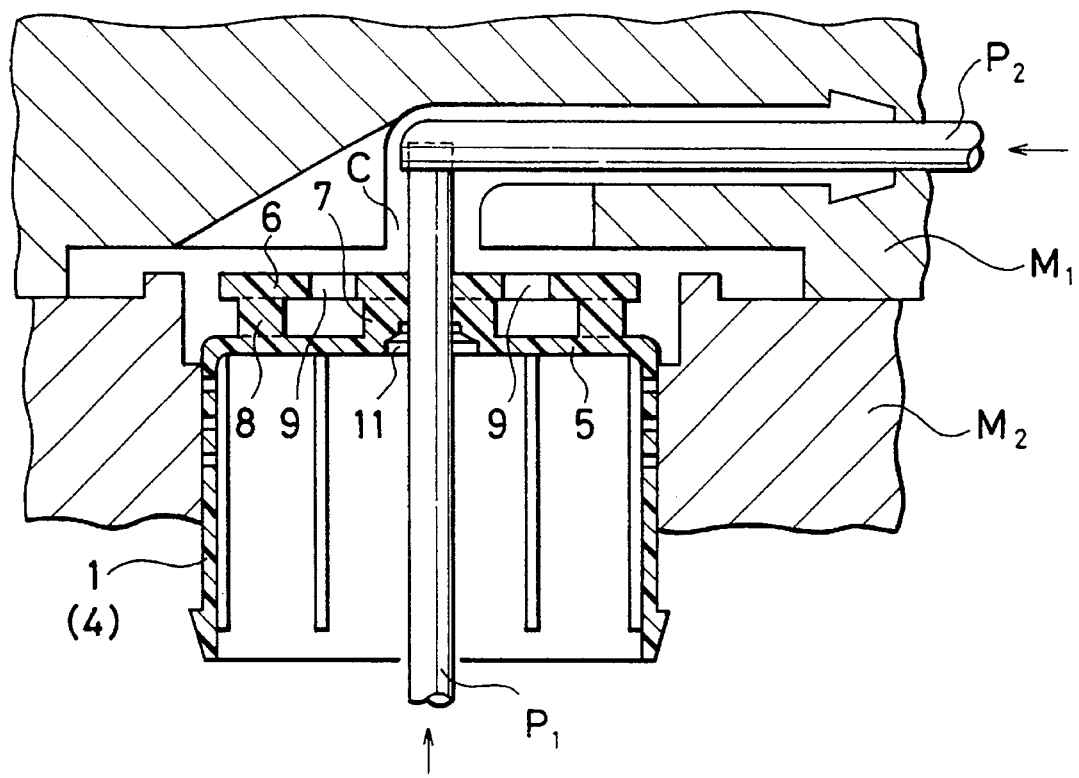
FIG. 1 is a sectional view showing the cavity of a die for forming the connecting pipe and the exhaust passage of an anti-spilling valve for a vehicle according to a first embodiment of the invention.
Figure 2:
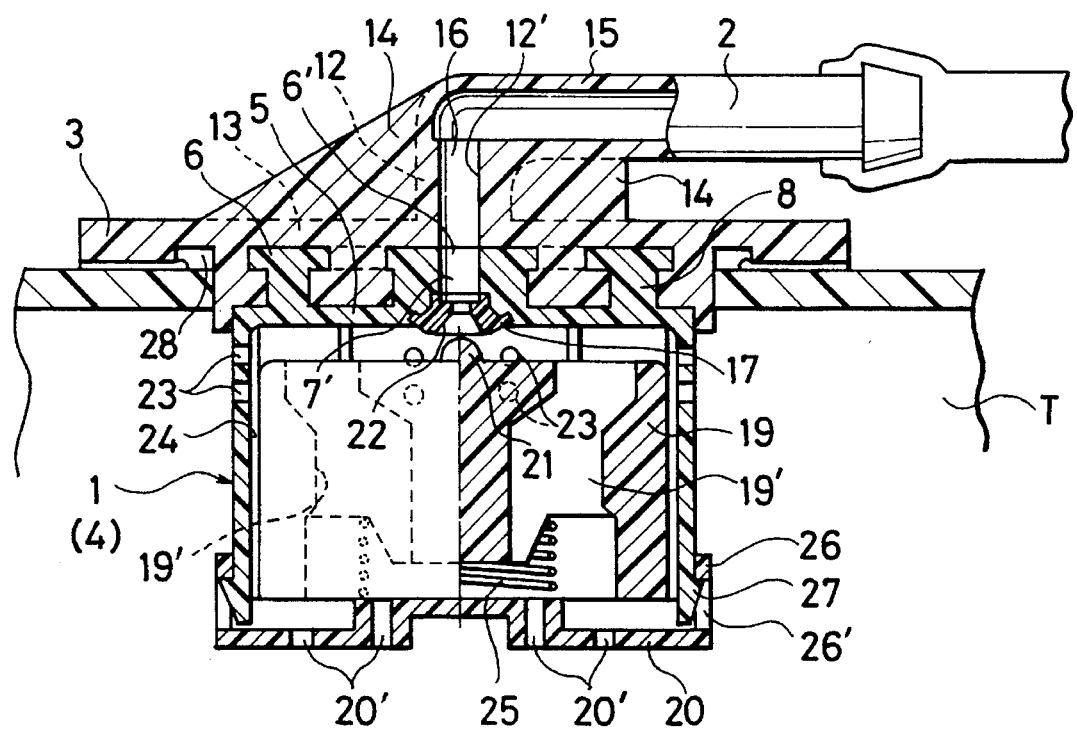
FIG. 2 is a sectional view showing how an anti-spilling valve according to the invention is installed in a fuel tank.

FIGS. 1 to 5 show a first embodiment of the anti-spilling valve for a vehicle fuel tank according to the present invention. In these figures, reference numeral 1 designates a cylindrical valve chamber formed of polyacetal resin, a material with high rigidity that can be molded with high dimensional precision.

Figure 3:
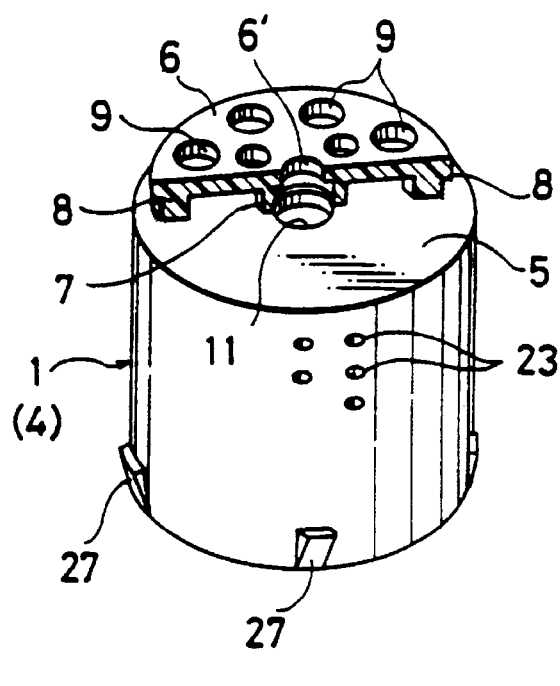
FIG. 3 is a perspective view of the cylindrical valve chamber of the anti-spilling valve of FIG. 2.

An example of the cylindrical valve chamber 1 is shown in FIG. 3. In the illustrated configuration, the cylindrical valve chamber 1 comprises a cylindrical wall 4 open at the bottom, an upper wall 5 closing the top of the cylindrical wall 4, a disk 6 of substantially the same shape as the upper wall 5 formed integrally with the upper wall 5 with the major portion thereof spaced slightly above the upper wall 5, a coupling cylinder 7 for coupling the upper wall 5 and the disk 6 at their center portions, and a coupling leg 8 for coupling the upper wall 5 and the disk 6 near their radial extremities. The disk 6 is formed with a number of large holes 9. The center of the disk 6 is formed with a 4-mm hole 6' that is of the same diameter as, and communicates with, the bore 7' of the coupling cylinder 7, while the center of the upper wall 5 is formed with a stepped opening 11 that is of larger diameter than, and communicates with, the coupling cylinder 7. The stepped opening 11 has a downwardly flared tapered section 10 at an intermediate portion of its vertical length.

The upper part of the cylindrical valve chamber 1 formed of polyacetal resin in the foregoing manner is positioned in a cavity C formed between an upper die $M_1$ and a lower die $M_2$ and is formed with a mounting member 15 for attaching the cylindrical valve chamber 1 to a fuel tank T. As shown in FIG. 1, only the part of the cylindrical valve chamber 1 upward of the top portion of the cylindrical wall 4, specifically the part including the upper surface of the upper wall 5 and the disk 6, is inserted into the cavity C. At the same time, a vertical core pin $P_1$ measuring 4 mm in diameter is inserted through the stepped opening 11 to pass upward through the bore 7' and the hole 6' and project above the disk 6, while a 4-mm lateral core pin $P_1$ for defining the bore of a connecting pipe 2 is inserted into the upper die $M_1$. The upper end of the core pin $P_1$ and the tip of the core pin $P_1$ are disposed in contact with each other and strongly pressed together as indicated by the arrows. Molten high-density polyethylene resin is then injected into the cavity C under high pressure. The injected molten resin completely fills the space enclosed by the disk 6 and the space extending from around the upper end of the cylindrical wall 4 to above the disk 6. As a result, the mounting member 15 is formed to have an annular flange 3, an upper portion 13 having an upright cylinder 12 enclosing the core pin $P_1$, and a reinforcement wall 14 connecting the connecting pipe 2 and the upper portion 13. The part of the upper portion 13 above the disk 6 and the part thereof formed by charging molten resin into the space between the bottom of the disk 6 and the upper surface of the upper wall 5 can be integrally formed owing to the presence of the large holes 9 formed in the disk 6.

After the connecting pipe 2 and the mounting member 15 have been formed of high-density polyethylene resin in the foregoing manner, the result is removed from the dies and the core pins $P_1$, $P_1$ are extracted. As a result, the connecting pipe 2 and an exhaust passage 16 are formed in communication with each other. In the present embodiment, the upper cover of the cylindrical valve chamber 1 is constituted by the polyacetal upper wall 5, the disk 6 and the polyethylene upper portion 13 having the upright cylinder 12. The exhaust passage 16 for passing out fuel vapor is constituted by the stepped opening 11, the hole 6' the bore 7' and the bore 12' of the upright cylinder 12 The hole 6' bore 7' and bore 12' all have a diameter of about 4 mm.

Figure 4:
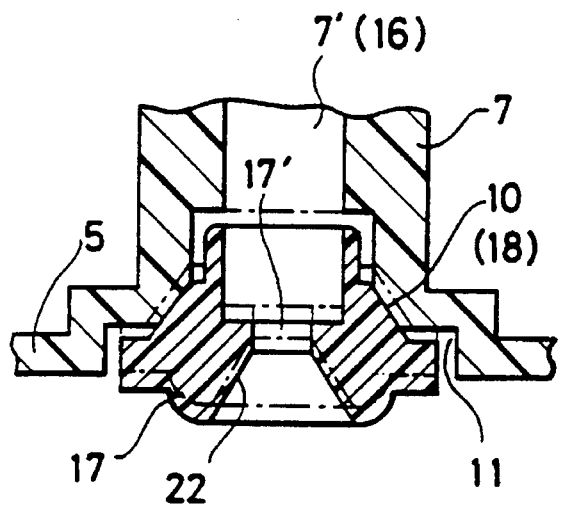
FIG. 4 is a sectional view showing how a valve seat ring is attached to an opening portion of the exhaust passage of the anti-spilling valve of FIG. 2.
Figure 5:
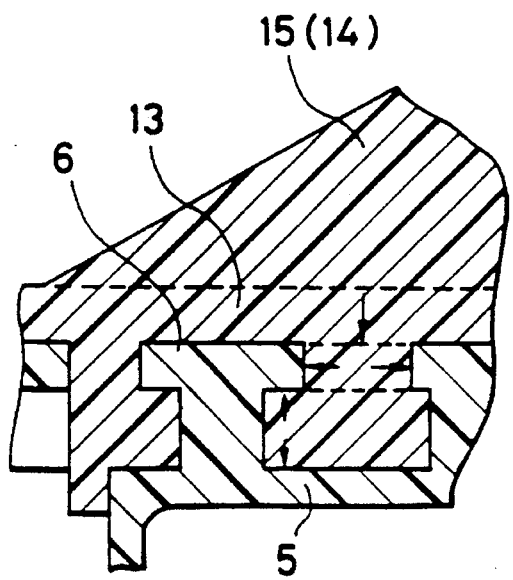
FIG. 5 is an explanatory view showing how swelling occurs when fuel enters between the cylindrical valve chamber and a mounting member of the anti-spilling valve according to the invention.

A valve seat ring 17 restricted to an inside diameter of 2 mm at one portion 17' is fixed within the stepped opening 11, by ultrasonic welding in the present invention (FIG. 4). The valve seat ring 17 has upper and lower cylindrical portions that fit into the upper and lower steps of the stepped opening 11 and an intermediate conical section 18 that mates with the intermediate tapered section 10 of the stepped opening 11. It is formed of the same polyacetal as the cylindrical valve chamber 1. Owing to this configuration, the upper and lower cylindrical portions can be joined with the upper and lower steps of the stepped opening 11 by holding the conical section 18 of the valve seat ring 17 in contact with the tapered section 10 of the stepped opening 11 and fusing the sections 10 and 18 by use of ultrasonic waves. The chain line in FIG. 4 indicates the shape of the valve seat ring 17 after welding.

After a float 19 of a diameter slightly smaller than the inside diameter of the cylindrical valve chamber 1 has been inserted into the cylindrical valve chamber 1, the open bottom of the chamber is closed with a filter 20. The filter 20 is formed with a low engagement wall 26 adapted to fit over the lower end of the cylindrical wall 4 and the engagement wall 26 is formed around its periphery with regularly spaced attachment holes 26'. When the engagement wall 26 is fitted over the lower end of the cylindrical wall 4 from below, its attachment holes 2' snap-engage with outwardly projecting catches 27 formed at corresponding positions around the cylindrical wall 4. The filter 20 is thus fixed on the cylindrical wall 4.

The float 19 and the filter 20 are both formed of polyacetal resin. A valve head 21 formed to project upward from the center of the upper surface of the float 19 is positioned such that it can mate with a conical valve seat 22 formed below the restricted portion 17' of the valve seat ring 17 to expand downwardly. The valve head 21 is thus able to close the exhaust passage 16 from below. A weak spring 25 is disposed between the float 19 and the filter 20.

After the cylindrical valve chamber 1 has been assembled in the foregoing manner, it is fitted in a mounting hole formed in the top of the fuel tank T and the entire undersurface of the flange 3 of the mounting member 15 is welded to the region of the upper surface of the fuel tank T surrounding the mounting hole.

Since the inner part of the underside of the flange 3 is formed with an annular groove 28, any excess high-density polyethylene resin that melts from the flange 3 or the fuel tank T flows into the annular groove 28 and does not ooze to the exterior of the flange 3. It is therefore possible to obtain a clean weld.

Since the welded flange 3 and fuel tank T are both made of high-density polyethylene resin, they exhibit the same rates of expansion and contraction when exposed to temperature changes. An excellent seal can therefore be maintained between the flange 3 and the fuel tank T irrespective of temperature change.

When the cylindrical valve chamber 1 is mounted in the fuel tank T in the foregoing manner, the filter 20 is positioned above the surface of the fuel in the tank, while the float 19 descends onto the filter 20 because its weight is greater than the upward force of the weak spring 25. As a result, the valve head 21 separates from the valve seat 22. Fuel vapor generated in the fuel tank is therefore able to pass through a plurality of small through-holes 20' formed in the filter 20, through a plurality of vertically aligned sets of radial holes 19' formed in the float 19 and then into the exhaust passage 16, and is also able to pass through a plurality of holes 23 formed in the upper part of the cylindrical wall 4, through the gap 24 between the inner surface of the cylindrical wall 4 and the outer surface of the float 19 and into the exhaust passage 16. The fuel vapor entering the exhaust passage 16 by these two routes passes into the connecting pipe 2, from where it is discharged through another pipe connected with the connecting pipe 2 into a canister (not shown). Buildup of pressure in the fuel tank is thus prevented. Although the valve seat ring 17 having the 2-mm restricted portion 17' is present at the lower end of the exhaust passage 16, the diameters of the hole 6', the bore 7' and the bore 12' are, at 4 mm, larger than that of the restricted portion 17' so that pressure loss can be held to less than a prescribed value.

Although a buoyant force acts on the float 19 when fuel enters the cylindrical valve chamber 1 owing to a large inertial force produced by rapid acceleration or sharp turning of the vehicle, this force alone is not strong enough to raise the float since the specific gravity of the float is greater than that of the fuel. However, the buoyant force combined with the force of the weak spring 25 acting upwardly on the float is sufficient to raise the float and bring the valve head 21 into close contact with the valve seat 22. Since fuel is therefore prevented from flowing into the exhaust passage 16 and the connecting pipe 2, it does not spill to the exterior. On the other hand, if the vehicle should turn over, the float 19 will descend by its own weight so that the valve head 21 will close the valve seat 22 and again prevent spilling of fuel to the outside. After the vehicle is righted and the fuel has flowed back into the fuel tank from the cylindrical valve chamber 1, the float compresses the weak spring 25 and returns to its original position, whereby pressure buildup in the fuel tank is prevented by escape of fuel vapor through the exhaust passage 16 and the connecting pipe 2.

If fuel (gasoline) from the hole 6' of the disk 6 should get into gaps between the disk 6 and the mounting member 15, it will cause the polyacetal resin and the high-density polyethylene to swell. However, since the rate of gasoline swelling is more pronounced in high-density polyethylene resin than in polyacetal resin, a stress will be produced in the directions indicated by arrows in FIG. 5 and, as a result, the seal between the disk 6 and the mounting member 15 will be enhanced.

While the foregoing embodiment was explained with respect to the case where the mounting member 15 is formed of high-density polyethylene resin, substantially the same effect can of course be obtained by forming the mounting member 15 of another material exhibiting approximately the same coefficient of thermal expansion as the high-density polyethylene resin of the fuel tank T.

Further, although the embodiment noted above was explained with respect to the case of using gasoline as the fuel, it is of course possible to use diesel fuel instead.

Figure 7:
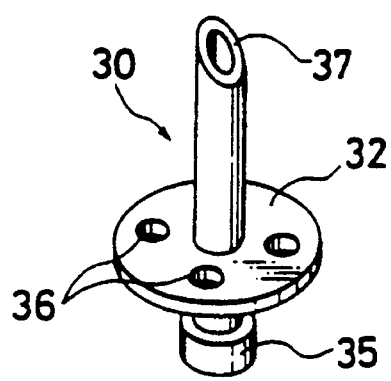
FIG. 7 is a perspective view a cylindrical piece used in the anti-spilling valve of FIG. 6.
Figure 6:
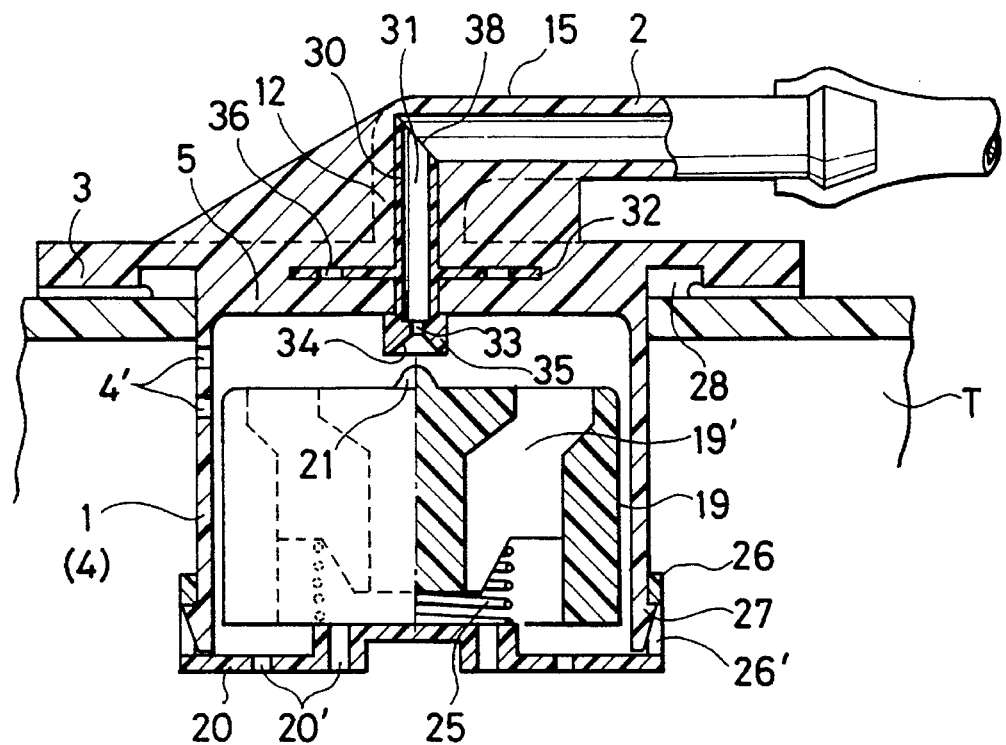
FIG. 6 is a sectional view showing how a second embodiment of the anti-spilling valve according to the invention is installed in a fuel tank.
Figure 8:
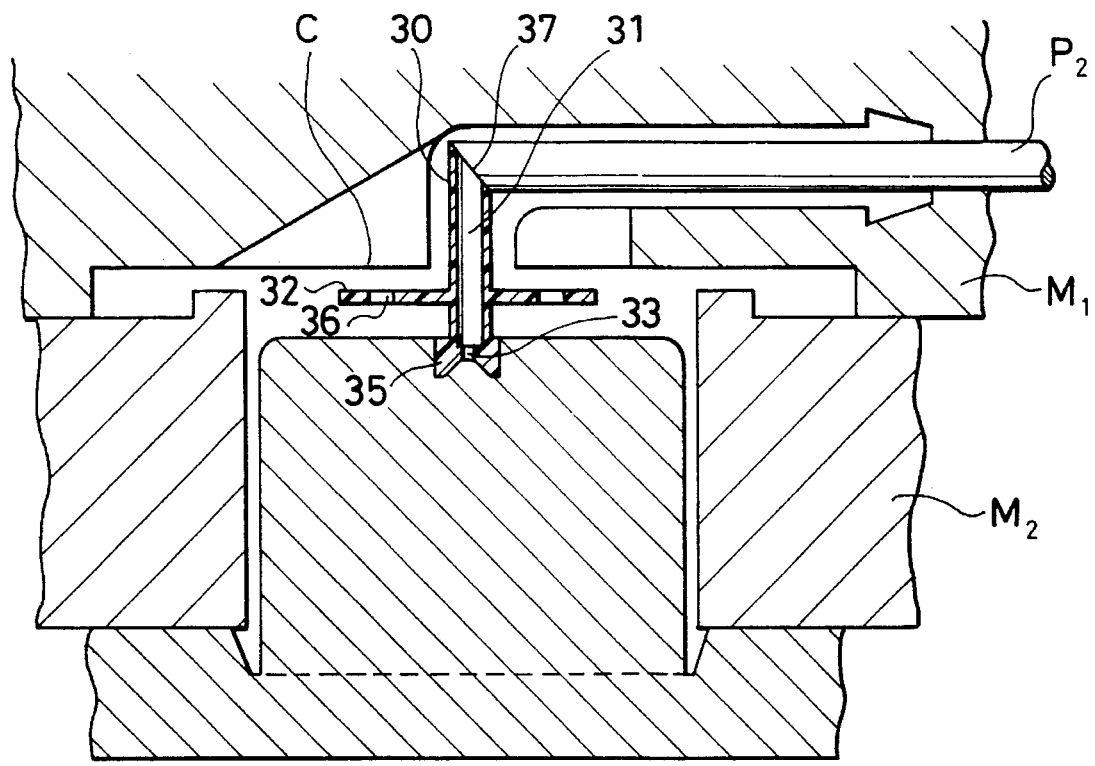
FIG. 8 is a sectional view showing how the cylindrical piece of FIG. 7 is disposed in a die cavity.

FIGS. 6 to 8 show a second embodiment of the anti-spill valve for a vehicle fuel tank according to the invention. In this embodiment, the upper wall 5 closing the top of the cylindrical valve chamber 1 and the mounting member 15 for fixing the anti-spilling valve to the fuel tank T are formed integrally, the connecting pipe 2 is formed in the mounting member 15, and a cylindrical piece 30 defining an exhaust passage 31 is imbedded mounting member 15.

The cylindrical piece 30 is shown in detail in FIG. 6. It is formed of polyacetal resin, a material with high rigidity that can be molded with high dimensional precision, to have an inside diameter of 4 mm and an outside diameter of 5 mm. The cylindrical piece 30 is cut at its upper end at an angle of, for example, 45° so as to form the exhaust passage 31 with a slanted opening 37, is integrally formed near its lower end with a flange 32, and is formed at its lower end with an enlarged portion 35 whose inner surface is configured as a conical valve seat 34 increasing in diameter downward from a 2-mm restricted portion 33 at the top. The flange 32 is preferably provided with a number of openings 36.

The fuel tank T in whose upper wall this antispill valve is to be mounted is made of high-density polyethylene resin, a material capable of a certain degree of expansion. So as to make it weldable to the tank, the valve is therefore also made of high-density polyethylene resin or a like plastic. The cavity C between the upper and lower dies $M_1$, $M_2$ is adapted for integrally forming the cylindrical valve chamber 1, the connecting pipe 2 and the flange 3 of the mounting member 15 for attachment to the upper wall of the fuel tank the cylindrical piece 30. The cylindrical piece 30 is positioned in the cavity C so as to pass vertically through the region for forming the upper cover. The lateral pin P2 for defining the bore of the connecting pipe is then passed through the portion for forming this pipe and its tip is pressed strongly onto the slanted opening 37 of the exhaust passage 31 of the cylindrical piece 30. Molten polyethylene resin is then injected into the cavity C under high pressure. As a result, the regions above the enlarged portion 35 of the cylindrical piece 30 and the flange 32 are imbedded in the resin for forming the mounting member. Moreover, if the flange 32 is formed with the openings 36, the portions of the resin above and below the flange 32 are united by the resin filling the openings 36. Thus the cylindrical valve chamber 1, which has the cylindrical wall 4 and the upper wall 5 and is formed with the flange 3 extending outward from the periphery of the upper wall 5, and the connecting pipe 2 projecting radially outward from the center of the mounting member 15 are formed integrally. When the pin $P_2$ is extracted, the upper end of the 4-mm exhaust passage 31, which has the 2-mm restricted portion 33 at the lower end of the cylindrical piece 30, and the bore of the connecting pipe 2 formed by the pin $P_2$ are connected at a right angle.

After a float 19 of a diameter slightly smaller than the inside diameter of the cylindrical wall 4 of the cylindrical valve chamber 1 has been inserted inside the cylindrical wall 4, the lower end of cylindrical wall 4 is closed in the same manner as in the first embodiment, namely by snap-engaging attachment holes 26' formed in an engagement wall 26 of a filter 20 with catches 27 provided around the lower end of the cylindrical wall 4. The float 19 and the filter 20 are both made of polyacetal resin. The center of the top surface of the float is formed with an upwardly protruding valve head 21 adapted for fitting into the valve seat 34 formed at the enlarged portion 35 at the lower end of the cylindrical piece 30 so as to close the exhaust passage 31 from below. A weak spring 25 is disposed between the float 19 and the filter 20.

The undersurface of the flange 3 of the mounting member 15 of the anti-spilling valve is welded to the region of the upper surface of a polyethylene fuel tank T surrounding a mounting hole formed in the tank. When the anti-spilling valve is mounted in this manner, the filter 20 is positioned above the surface of the fuel in the tank, while the float 19 descends onto the filter 20 and the valve head 21 consequently separates from the valve seat 22. Fuel vapor generated in the fuel tank is therefore able to pass through a plurality of small through-holes 20' formed in the filter 20, through a plurality of vertically aligned sets of radial holes 19' formed in the float 19 and then into the exhaust passage 31, and is also able to pass through a plurality of holes 23 formed in the upper part of the cylindrical wall 4, through the gap 24 between the inner surface of the cylindrical wall 4 and the outer surface of the float 19 and into the exhaust passage 31. The fuel vapor entering the exhaust passage 31 by these two routes passes into the connecting pipe 2, from where it is discharged through another pipe connected with the connecting pipe 2 into a canister (not shown). Buildup of pressure in the fuel tank is thus prevented. Although the restricted portion 33 is present at the lower end of the exhaust passage 31, pressure loss can be held to less than a prescribed value since the diameter of the passage upstream of the restricted portion is large.

Although a buoyant force acts on the float 19 when fuel enters the cylindrical valve chamber 1 owing to a large inertial force produced by rapid acceleration or sharp turning of the vehicle, this force alone is not strong enough to raise the float since the specific gravity of the float is greater than that of the fuel. However, the buoyant force combined with the force of the weak spring 25 acting upwardly on the float is sufficient to raise the float and bring the valve head 21 into close contact with the valve seat 22. Since fuel is therefore prevented from flowing into the exhaust passage 31 and the connecting pipe 2, it does not spill to the exterior. On the other hand, if the vehicle should turn over, the float 19 will descend by its own weight so that the valve head 21 will close the valve seat 22 and again prevent spilling of fuel to the outside. After the vehicle is righted and the fuel has flowed back into the fuel tank from the cylindrical valve chamber 1, the float compresses the weak spring 25 and returns to its original position, whereby pressure buildup in the fuel tank is prevented by escape of fuel vapor through the exhaust passage 31 and the connecting pipe 2.

As is clear from the foregoing explanation, in the first embodiment of the invention the connecting pipe and the exhaust passage are formed to have the same diameter. This is accomplished by strongly pressing the tip of a lateral pin onto the upper end of a vertical pin of the same diameter so as to form a connecting pipe along with an exhaust passage whose upper end communicates with the inner end of the connecting pipe. Although a valve seat ring having a small-diameter restricted portion is attached to the lower end of the exhaust passage, pressure loss can be held to less than a prescribed value since the diameter of the passage upstream of the restricted portion is large.

In the second embodiment of the invention, a cylindrical piece is formed beforehand of rigid plastic so as to define an internal exhaust passage. The cylindrical piece is positioned in the cavity between upper and lower dies for forming the cylindrical valve chamber and the connecting pipe and the inner end of a lateral pin for defining the bore of the connecting pipe is pressed strongly onto the upper end of the cylindrical piece so as to enable the cylindrical valve chamber and the connecting pipe to be formed integrally, while at the same time communicating the inner exhaust passage of the cylindrical piece with the bore at the inner end of the connecting pipe at right angles. Thus, while in the prior art it may become impossible to form the exhaust passage owing to bending of the thin pin used for defining the passage, the present invention is consistently able to properly form the exhaust passage owing to the use of the rigid cylindrical piece.

In addition, if the mounting member is made of a resin whose coefficient of thermal expansion is approximately the same as that of the resin used for forming the fuel tank, the flange of the mounting member and the fuel tank to which it is welded with high sealing property will exhibit approximately the same rates of expansion and contraction when exposed to temperature changes. The excellent seal between the flange and the fuel tank can therefore be maintained irrespective of temperature change.

Japanese Patent Application Nos. Hei 3(1991)-87581, 3(1991)-87582 and 4(1992)-90745 filed Oct. 1, 1991, Oct. 1, 1991 and Dec. 14, 1992 are hereby incorporated by reference.

What is claimed is:

1. An anti-spilling valve for a vehicle fuel tank, which comprises:

a cylindrical valve chamber having an upper wall at an upper end thereof and a center portion having a bore communicating with an exhaust passage;

a filter which closes a lower end of said chamber;

a float housed in the cylindrical valve chamber so as to be vertically movable and having a valve head on an upper surface of the float, said valve head closing a lower end of the bore; and a valve seal ring attached by ultrasonic wave fusion to a lower end of the bore and having an inside diameter smaller than the exhaust passage.

2. An anti-spilling valve for a vehicle fuel tank according to claim 1, which comprises:

a mounting member provided on the upper wall of the cylindrical valve chamber, said mounting member mounting the cylindrical valve chamber in an opening of the fuel tank wherein the exhaust passage is formed in the mounting member.

3. An anti-spilling valve according to claim 1, wherein the mounting member is formed of a resin having substantially the same coefficient of thermal expansion as the resin of which the fuel tank is formed.

4. An anti-spilling valve according to claim 3, wherein the resin comprises a high-density polyethylene resin.

5. An anti-spilling valve for a vehicle fuel tank formed of a resin, which comprises:

a cylindrical valve chamber having an upper wall at an upper end thereof and formed at a center portion thereof with a bore;

a filter closing an end portion of the valve chamber wherein the cylindrical valve chamber is formed of a polyacetal resin;

a mounting member having a flange fixing the cylindrical valve chamber in a sealed condition in an opening of the fuel tank, the mounting member having an exhaust passage that communicates with the bore of the cylindrical valve chamber and being formed of a resin having substantially the same coefficient of thermal expansion as the resin of the fuel tank;

a float housed in the cylindrical valve chamber, said float being vertically movable and having a valve head located on an upper surface thereof, said valve head closing a lower end of the bore; and a valve seal ring attached to a lower end of the bore and having an inside diameter smaller than the exhaust passage.

6. An anti-spilling valve according to claim 5, wherein the resin of the mounting member comprises a high-density polyethylene resin.

* * * * *